UNITED STATES PATENT OFFICE 2,625,556

PROCESS FOR OXIDIZING STEROID ALCOHOLS

Arnold C. Ott and Maxton F. Murray, Kalamazoo, Mich., assignors to The Upjohn Company, Kalamazoo, Mich., a corporation of Michigan No Drawing. Application July 15, 1949, Serial No. 105,062

19 Claims. (Cl. 260—397.1)

The present invention relates to an improvement in the art of oxidizing polycyclic alcohols to their corresponding ketones, and is more particularly concerned with a process in which polycyclic alcohols, containing at least one hydroxyl group which is theoretically capable of oxidation into a keto group, said alcohols usually being of the type containing a cyclopentanopolyhydrophenanthrene nucleus, are reacted with a hydrogen acceptor selected from the group consisting of aldehydes and ketones in the presence of a lithium aluminum organic radical complex.

The employment of certain aluminum alkoxides, in conjunction with an aldehyde or ketone, to oxidize polycyclic alcohols to polycyclic ketones has been described in U. S. Patent 2,384,335, issued September 4, 1945, to Oppenauer; in "Newer Methods of Preparative Chemistry," 143–158, Interscience Publishers, New York, N. Y. (1948); and elsewhere. The Oppenauer method has been widely accepted since its appearance as no other reagents have been shown to make possible the same variety of oxidations by the use of aldehydes and ketones as hydrogen acceptors.

It is, therefore, an object of the present invention to provide an improvement in the art of oxidizing polycyclic alcohols, containing at least one hydroxyl group theoretically capable of oxidation to a keto group, by reaction wtih a hydrogen acceptor selected from the group consisting of aldehydes or ketones in the presence of a lithium aluminum organic radical complex. A further object of the invention is the provision of a novel process for the oxidation of polycyclic alcohols, especially alcohols of the type containing a cyclopentanopolyhydrophenanthrene nucleus, to a ketone, by reaction of the starting polycyclic alcohol with a hydrogen acceptor selected from the group consisting of aldehydes and ketones, in the presence of a lithium aluminum organic radical complex, which process may be productive of a product sufficiently uncontaminated so that direct crystallization may be employed to yield a pure product. Other objects of the invention will become apparent hereinafter.

The objects of the present invention are accomplished, and polycyclic alcohols are oxidized to ketones, in a simple manner by subjecting the starting polycyclic alcohol to the action of a hydrogen acceptor containing a keto or aldehyde group, in the presence of a lithium aluminum organic radical complex. The polycyclic alcohol apparently yields two atoms of hydrogen, per molecule per hydroxyl group oxidized, to the aldehyde or ketone, whereby the hydroxyl group of the polycyclic alcohol is converted into a keto group. The method of the present invention is particularly adapted to the production of ketones from secondary polycyclic alcohols containing a cyclopentanopolyhydrophenanthrene nucleus.

The lithium aluminum organic radical complex, in the presence of which the starting polycyclic alcohol is oxidized to the ketone, is formed easily by the reaction of lithium aluminum hydride and, for example, an organic compound containing a carbonyl group, in which reaction the carbonyl group is converted to a hydroxyl group with the simultaneous production of the lithium aluminum organic radical complex. Representative citations to the art of preparing such lithium aluminum organic radical complexes are Nystrom and Brown, J. Am. Chem. Soc. 69, 1197 (1947), and Nystrom, Yanko and Brown, ibid. 70, 441 (1948), who transformed carbonyl groups to hydroxyl groups with lithium aluminum hydride; and Krynitzsky, Johnson and Carhart, J. Am. Chem. Soc. 70, 486 (1948), who determined the presence of active hydrogen in organic molecules using lithium aluminum hydride. The complex formed during the course of such reaction has a formula postulated as $LiAlY$, wherein Y is selected from $(-O-R)_4$, $(-S-R)_4$, $(-N-R_2)_4$, and $(=N-R)_2$ wherein R is a hydrocarbon radical. R may represent, for example, an alkyl, cycloalkyl, aryl, cycloalkylalkyl, aralkyl, alkylcycloalkyl, alkaryl, alkycycloalkylalkyl, or an alkylaralkyl radical. Preferably the hydrocarbon radical contains up to and including eight carbon atoms. Lower-alkyl radicals containing up to and including eight carbon atoms are especially preferred. Representative radicals are the methyl, ethyl, propyl, isopropyl, butyl, isobutyl, amyl, hexyl, heptyl, octyl, cyclopentyl, benzyl, phenyl, cyclohexyl, cyclohexylmethyl, methylphenyl, methylbenzyl, ethylcyclopentenyl, methylcyclohexenyl, and methylcyclopentylmethyl. The two R groups in a $(-N-R_2)$ radical may also form a heterocyclic ring with the nitrogen atom, such as a pyridine, piperidine, pyrrolidine, or other 5 or 6 membered heterocyclic rings. These complexes are prepared by reaction of lithium aluminum hydride with an aldehyde, ketone, alcohol, thioalcohol or like type of compound, as indicated more fully in the following. For example, the postulated formula of the reaction product of $LiAlH_4$ and an amine, such as aniline, is $LiAl(NC_6H_5)_2$, and the lithium aluminum piperidine complex is $LiAl(C_5H_{10}N)_4$. The formulas for a number of carbonyl compounds, suitable for reaction with lithium aluminum hydride to prepare the lithium aluminum organic radical complex employed in the method of the present invention, are given by Nystrom and Brown, supra.

In many instances, the same value of R results, though different organic compounds are used in preparation of the complex from lithium aluminum hydride. For example, the same complex is formed with lithium aluminum hydride and either carbon dioxide or methyl alcohol, as illustrated by the following:

$$2LiAlH_4 + 4CO_2 \rightarrow LiAl(OCH_3)_4 + 2LiAlO_2$$
$$LiAlH_4 + 4CH_3OH \rightarrow LiAl(OCH_3)_4 + 4H_2$$

Likewise, the same complex is formed by the reaction of lithium aluminum hydride and either isopropyl alcohol or acetone, as indicated by the following:

$$LiAlH_4 + 4(CH_3)_2CHOH \rightarrow LiAl[OCH(CH_3)_2]_4 + 4H_2$$
$$LiAlH_4 + 4(CH_3)_2C=O \rightarrow LiAl[OCH(CH_3)_2]_4$$

For the purposes of the present invention, the lithium aluminum organic radical complex may be conveniently prepared by reacting lithium aluminum hydride with an aldehyde, ketone, thioketone, alcohol, thioalcohol, thiophenol, phenol ester, acid chloride, acid anhydride, primary amine, secondary amine, or the like, in which case the complex will have the formula LiAlY given above, the identity of Y in such complex corresponding to the particular organic compound with which the lithium aluminum hydride is reacted. The organic radical R, in such molecule, in the case of the reaction of lithium aluminum hydride with a nitrogen compound, such as a primary or secondary amine, will depend upon the organic radicals attached to the amine nitrogen, primary amines giving a complex having the formula $LiAl(=N-R)_2$, while secondary amines give a complex having the formula $$LiAl(-N-R_2)_4$$

The preferred embodiment of the present invention contemplates the employment of lithium aluminum organic radical complex, wherein the organic radical designated as R is an alkyl radical. Preferably the alkyl radical contains up to and including eight carbon atoms. The use of ketones in the preparation of the complex is preferred, since no hydrogen is evolved and the complex is more quickly and easily prepared than when other organic compounds are used, but alcohols are likewise of utility in this capacity. The reaction of the lithium aluminum hydride and the particular organic compound employed in the preparation of lithium aluminum organic radical complex may be readily conducted according to the teaching of the prior art by mixing the organic compound with the lithium aluminum hydride, the lithium aluminum hydride being dissolved in an anhydrous ether, such as, for example, diethyl ether, tetrahydrofuran, N-ethylmorpholine, or the like.

The particular aldehyde or ketone employed as hydrogen acceptor in the method of the present invention is not critical, and ketones and aldehydes of the aliphatic, alicyclic, or aromatic series may be employed. Representative aldehydes and ketones include acetone, cyclohexanone, diethyl ketone, dimethyl ketone, methyl ethyl ketone, methyl butyl ketone, cyclopentanone, dibutyl ketone, acetaldehyde, butyraldehyde, benzaldehyde, actophenone, and the like. The aldehyde or ketone employed as hydrogen acceptor should preferably be present in the reaction mixture in an amount in excess of that required for the oxidation, i. e., in excess of about one mole of the aldehyde or ketone per each hydroxyl group per mole of the polycyclic alcohol desired to be oxidized. Preferably about twice the amount of aldehyde or ketone theoretically required for the oxidation is employed. Of course, if several hydroxyl groups are present in the polycyclic molecule, and it is desired to oxidize but one, it will be apparent that the proportion of aldehyde or ketone to starting alcohol employed should be as near to equimolar proportions as practicable.

In order to increase the reaction speed, the oxidation is generally carried out at an increased temperature, for example, with heating to from 40 to 150 degrees centigrade, preferably at the reflux temperature of the reaction mixture. The time required for completion of the oxidation reaction varies with the particular polycyclic alcohol being oxidized and the particular lithium aluminum organic radical complex employed, but the reaction time is ordinarily from ten to eighty hours and ordinarily considerably less than half of the maximum time stated.

The oxidation reaction is preferably conducted in a liquid inert diluent or solvent for the reaction, which is useful in obtaining efficient contact of the reactants and hence increasing the speed of reaction. When the lithium aluminum organic radical complex is prepared from an aldehyde or ketone, the diluent employed may be an excess of the aldehyde or ketone used in the preparation of the complex. Otherwise, the diluent may be a hydrocarbon such as benzene, toluene, xylene, hexane, cyclohexane, octane, or the like. In most instances, the oxygen, nitrogen or sulfur-containing organic material used to prepare the original lithium aluminum organic radical complex is entirely satisfactory.

Polycyclic alcohols which are suitable as starting materials in the present invention are polycyclic secondary alcohols wherein at least one hydroxyl group is theoretically capable of being converted to a keto group. Compounds of the cyclopentanopolyhydrophenanthrene series are especially suitable, and such include, for example, cholesterol, dehydroepiandrosterone, 5-pregnene-3-ol-20-one, 3-hydroxy-bisnor - 5 - cholenates, testosterone, 5-androstene-3,17-diol, and partial esters of the polyhydric alcohols, as indicated in the examples. Still other suitable starting materials include dehydroandrosterone, mono-esters of androstenediol, such as androstenediol acetate, ergosterol, stigmasterol, lumisterol, and many other compounds of the cyclopentanopolyhydrophenanthrene nucleus having a secondary hydroxyl group such as hydroxy-esters and hydroxy-ketones.

When the starting cyclopentanopolyhydrophenanthrene alcohol contains a double bond in the nucleus which is two bonds removed from the hydroxyl group undergoing the oxidation, as in the case of a double bond in the 5-position of the cyclopentanopolyhydropenanthrene alcohol having the hydroxyl group in the 3-position, the oxidation will of course also produce a shift in the double bond to the position one bond nearer to the hydroxyl undergoing oxidation, in which case a conjugated system will result by virtue of the formation of a keto group as in the 3-position, and a double bond shift as to the 4-position. Such double bond shifts occur in the oxidation of pregnenolone to progesterone, and in various other similar steroids, which will be apparent to one skilled in the art. However, such double bond shift is not to be considered an undesirable result of the process, and it is to be understood that the oxidation of any polycyclic secondary alcohol is fully within the scope of the present invention, whether or not a double bond shift is simultaneously effected.

In general, the process of the present invention is conducted under conditions quite similar to those already known in the art to be effective in conducting oxidations with the employment of aluminum alkoxides, as shown in the "Newer Methods of Preparative Chemistry" citation mentioned above. After completion of the oxidation reaction, the mixture of reaction products is cooled to about room temperature, acidified, and steam-distilled until the distillate is free from the excess of ketone or aldehyde employed and any alcohol or acid formed from them as by-products during the reaction. The desired ketonic reaction product is then separated from the residue, preferably by extraction with an organic solvent such as benzene, chloroform ether, toluene, chlorobenzene, or the like, whereafter solvent is removed and the product crystallized from a suitable solvent, such as ethyl acetate or petroleum ether.

The following examples are illustrative of the present invention, but are not to be construed as limiting.

Example 1.—Oxidation of cholestanol to cholestenone

The lithium aluminum complex was prepared by the addition of 1.5 grams of lithium aluminum hydride, dissolved in 150 milliliters of anhydrous ethyl ether, to a solution of 12.2 grams of tertiary butyl alcohol in 50 milliliters of anhydrous ethyl ether, with efficient stirring over a period of 30 minutes. The mixture was stirred for an additional fifteen minutes and the solvents removed by distillation under reduced pressure. The resulting complex, suspended in 50 milliliters of toluene, was added to a mixture of 3.9 grams of cholestanol, 59 grams of cyclohexanone, and 150 milliliters of dry toluene, the mixture heated under reflux for 18 hours, acidified to a pH of about 6 with dilute sulfuric acid, and steam-distilled until the distillate gave a negative test for ketone with 2,4-dinitrophenylhydrazine. The aqueous residue was then extracted three times with 50-milliliter portions of chloroform, the organic extracts combined, dried, and the solvent removed. Upon crystallization of the residue from acetone, cholestenone, melting at 125-128 degrees centigrade, was obtained.

Example 2.—Oxidation of cholesterol to 4-cholestenone-3

The lithium aluminum complex was prepared by the dropwise addition of 20 grams of purified acetone to 2.27 grams of lithium aluminum hydride dissolved in 250 milliliters of anhydrous ether over a period of 15 minutes, while maintaining the reaction mixture at about five degrees centigrade by means of a cooling bath. The solvent was then removed, the residual complex suspended in 350 milliliters of dry toluene, and the suspension added to 7.74 grams of cholesterol and 50 grams of freshly-distilled cyclohexanone. The mixture was stirred and heated under reflux for 18 hours, cooled, acidified to a pH of about 6 with dilute sulfuric acid, and steam-distilled until the distillate gave a negative test for ketone with 2,4-dinitrophenylhydrazine. The aqueous residue was extracted three times with 50-milliliter portions of chloroform, the extracts combined, dried, and the chloroform removed. Crystallization of the residue from a 2:1 mixture of acetone and methanol gave 4-cholestenone-3, melting at 79.5 to 80 degrees centigrade.

Example 3.—Oxidation of dehydroepiandrosterone to 4-androstene-3,17-dione

The lithium aluminum complex was prepared by the addition of 0.3 gram of lithium aluminum hydride, dissolved in 100 milliliters of anhydrous ethyl ether, to 4.2 grams of cyclopentanone dissolved in 25 milliliters of anhydrous ethyl ether, over a period of 15 minutes, while maintaining the temperature of the reaction mixture below about five degrees centigrade by means of a cooling bath. The solvent was then removed, the complex suspended in 100 milliliters of dry toluene, and the suspension added to a solution of one gram of dehydroepiandrosterone in 80 gram of acetone. The reaction mixture was stirred and heated under reflux for 24 hours. The compound 4-androstene-3,17-dione, melting at 168 to 170 degrees centigrade, was isolated from the reaction mixture by the extraction procedure employed in Example 1.

Example 4.—Oxidation of 5-pregnene-3-beta-ol-20-one to 4-pregnene-3,20-dione (progesterone)

The lithium aluminum complex was prepared from 0.5 gram of lithium aluminum hydride and 5.5 grams of diethyl ketone by the procedure described in Example 2. The complex, suspended in 100 milliliters of anhydrous toluene, was then added to one gram of 5-pregnene-3-beta-ol-20-one and 30 grams of cyclopentanone, dissolved in 80 milliliters of dry toluene. The reaction mixture was stirred and heated under reflux for 40 hours, whereafter the reaction product was isolated essentially in the manner described in Example 1. Crystallization of the residue from 95 percent ethanol yielded progesterone, melting at 126-127 degrees centigrade.

Example 5.—Oxidation of methyl 3-beta-hydroxy bisnor-5-cholenate to 3-keto-bisnor-4-cholenic acid The lithium aluminum complex was prepared by the procedure given in Example 2 from one gram of lithium aluminum hydride and 17 grams of freshly-distilled methyl ethyl ketone. The complex was suspended in 50 milliliters of anhydrous benzene and added to a solution and 1.3 grams of methyl 3-beta-hydroxybisnor-5-cholenate and 19.2 grams of purified methyl ethyl ketone in 160 milliliters of dry benzene. The reaction mixture was stirred and heated under reflux for 75 hours, cooled, acidified to a pH of about 5 with dilute sulfuric acid, and steam-distilled for eight hours. The aqueous residue was extracted three times with 100-milliliter portions of benzene, the extracts combined, and the combined extract concentrated to about 10 percent of its original volume. One gram of potassium carbonate, 12 milliliters of benzene, and 25 milliliters of methanol were then added, and the mixture heated under reflux for five hours, cooled, and diluted with an equal volume of 1 N potassium hydroxide solution. The organic layer was separated and extracted three times with 50-milliliter portions of 1 N potassium hydroxide solution. The aqueous extracts were combined, acidified with 6 N hydrochloric acid, and the organic acid extracted with chloroform.

The chloroform extract was dried, chloroform removed, and the residue dissolved in hot ethyl acetate. Upon standing, 3-keto-bisnor-4-cholenic acid, a crystalline solid melting with decomposition at 260 to 263 degrees centigrade, separated therefrom.

*Example 6.—Oxidation of testosterone to 4-androstene-3,17-dione*

The lithium aluminum complex was prepared from 0.4 gram of lithium aluminum hydride, 100 milliliters of anhydrous ethyl ether, and 9.8 grams of freshly-distilled cyclohexanone. To the stirred suspension of the complex was added one gram of testosterone, 49 grams of cyclohexanone, and 150 milliliters of dry xylene. The mixture was warmed to remove the ether, and then heated under reflux for 24 hours. The reaction mixture was treated for recovery purposes as described in Example 1, yielding 4-androstene-3,17-dione, melting at 170–171 degrees centigrade.

PREPARATION 1.—PREPARATION OF 5-ANDROSTENE-3-BETA,17-BETA-DIOL

To a mixture of one part of 5-androstene-3-beta-ol-17-one (melting point 144–145 degrees centigrade), 1.16 parts of freshly-distilled dihydropyran, and 29 parts of peroxide-free diethyl ether, was added one drop of concentrated hydrochloric acid, whereafter the reaction mixture was allowed to stand at room temperature for sixty hours. Excess acid was removed by the addition of a pellet of sodium hydroxide, the solution filtered immediately, the filtrate washed with water until neutral, and then dried. The residue, after removal of ether and crystallization from acetone, gave the two forms of 5-androstene-3-beta-ol-17-one, 3-(2'-tetrahydropyranyl) ether resulting from introduction of the new asymmetric carbon atom in the pyranyl group, melting at about 172–173 degrees centigrade and 192–194 degrees centigrade, $[\alpha]_D^{25}$(chloroform) minus 71.9 degrees, with the higher-melting form predominating.

To one part of lithium aluminum hydride, dissolved in 200 parts of anhydrous diethyl ether, there was gradually added three parts of 5-androstene-3-beta-ol-17-one, 3-(2'-tetrahydropyranyl) ether, and the reaction mixture heated under reflux for an additional one and one-half hours.

The excess lithium aluminum hydride was decomposed by the addition of a solution of ten percent ethyl acetate in ether. The reaction complex was then hydrolyzed with one hundred milliliters of five percent sodium hydroxide solution (the ether being unstable in the presence of acid), the ethereal layer separated, washed with water, dried, and the ether removed. After crystallization from acetone, 2.85 parts of 5-androstene-3-beta, 17 - beta - diol, 3 - (2' - tetrahydropyranyl) ether, melting at 161–162 degrees centigrade, was obtained.

PREPARATION 2.—5-ANDROSTENE-3-BETA,17-BETA-DIOL, 3-(2'-TETRAHYDROPYRANYL) ETHER,17-CYCLOPENTYLPROPIONATE

To a solution of 1.87 parts of 5-androstene-3-beta,17 - beta-diol, 3 - (2' - tetrahydropyranyl) ether, dissolved in ten parts of pyridine and cooled to five degrees centigrade, was added one part of beta-cyclopentylpropionyl chloride. The reaction mixture was removed from the cooling bath and allowed to stand overnight at room temperature. One hundred milliliters of ether was added to the reaction mixture, which was then extracted with cold ten percent sodium bicarbonate solution, five percent acetic acid solution, ten percent sodium bicarbonate solution, and water. The ether solution was dried, the ether removed and the residue crystallized from ethyl alcohol, whereupon 2.5 parts of 5-androstene-3-beta,17 - beta-diol, 3- ( 2' - tetrahydropyranyl) ether,17-beta-cyclopentylpropionate, melting at 134.5–136.5 degrees centigrade, $[\alpha]_D^{25}$ (chloroform) minus 40.4 degrees, was obtained.

PREPARATION 3.—5-ANDROSTENE-3-BETA,17-BETA-DIOL, 17-CYCLOPENTYLPROPIONATE

To a solution of nine parts of 5-androstene-3-beta,17 - beta-diol, 3 - (2' - tetrahydropyranyl) ether,17-cyclopentylpropionate, dissolved in 100 parts of boiling ethyl alcohol, was added 20 parts of water and 2 parts of concentrated hydrochloric acid and the solution heated under reflux for 45 minutes. The reaction mixture was cooled and the resulting precipitate collected, washed with cold ethyl alcohol, and dried. There was thus obtained 5.2 parts of 5-androstene-3-beta,-17-beta-diol, 17-cyclopentylpropionate, melting at 134–136 degrees centigrade. An additional 0.8 parts of product, melting at 136–137 degrees centigrade after crystallization from alcohol, was obtained by concentration of the mother liquor.

*Example 7.—Oxidation of 5-Androstene-3-beta,-17-beta-Diol, 17-cyclopentylpropionate to Testosterone Cyclopentylpropionate*

Lithium aluminum hydride (0.95 gram) was dissolved in 100 milliliters of anhydrous ether and ten milliliters of acetone added slowly thereto at room temperature.

A mixture of 4.15 grams of 5-androstene-3-beta,17-beta-diol, 17-cyclopentylpropionate from Preparation 3, 300 milliliters of toluene and 73.5 grams of cyclohexanone was distilled until 100 milliliters of distillate was collected, whereupon the solution was cooled and the ether solution of the lithium aluminum isopropylate added. The reaction mixture was heated and distillation continued, using a 12-inch Vigreaux column, until the temperature of the vapors reached 110 degrees centigrade, when the distilling column was removed. The reaction mixture was then heated under reflux, with stirring, for an additional 18 hours, cooled to room temperature, poured into 500 milliliters of ice water, acidified to pH 6 with dilute sulfuric acid, and steam-distilled. The residue was extracted with ether, the ether layer washed, dried, and the ether removed. The precipitate was dissolved in a mixture of 90 milliliters of absolute ethyl alcohol. Ten milliliters of glacial acetic acid and 2.5 grams of Girard's Reagent T was added and the solution heated under reflux for one and one-half hours. One hundred milliliters of anhydrous ethylene glycol was then added and the ethyl alcohol removed by distillation. The glycol layer was separated, extracted with anhydrous ether to remove non-ketonic material, poured into 400 milliliters of 1.5 N hydrochloric acid, and allowed to stand overnight. The mixture was then extracted with ether, the ether extract separated, washed with water, dried, and the ether removed.

The residue was purified by chromatography on a 1:1 diatomaceous earth (Celite) and magnesium silicate column using a mixture of equal parts of hexane and benzene to develop the column and a mixture of five parts of benzene and one part of ether to elute the product. One gram of testosterone cyclopentylpropionate, melting after crystallization from low boiling petroleum ether at 100 degrees centigrade, and showing no lowering of the melting point when mixed with an authentic sample, was obtained from the benzene-ether eluate.

Other modes of applying the principle of the invention may be employed instead of those explained, change being made as regards the method or products herein disclosed, provided the steps or compounds stated by any of the following claims, or the equivalent of such stated steps or compounds, be employed.

Having thus described our invention, we claim:

1. The process for the conversion of a hydroxyl group to a keto group in a polycyclic alcohol, which comprises subjecting, under substantially anhydrous conditions, a secondary alcohol of the cyclopentanopolyhydrophenanthrene series in which it is theoretically possible to convert at least one hydroxyl group to a keto group, to the action of a hydrogen acceptor selected from the group consisting of aldehydes and ketones, in the presence of a lithium aluminum alcoholate.

2. A process for the conversion of a hydroxyl group to a keto group in an alcohol of the cyclopentanopolyhydrophenanthrene series, which consists in subjecting, under substantially anhydrous conditions, a secondary alcohol of the cyclopentanopolyhydrophenanthrene series, in which it is theoretically possible to convert at least one hydroxyl group to a keto group, to the action of a hydrogen acceptor selected from the group consisting of aldehydes and ketones, in the presence of a lithium aluminum organic radical complex, represented by the formula $LiAl(-O-R)_4$, wherein R represents a hydrocarbon radical.

3. A process for the conversion of a hydroxyl group to a keto group in an alcohol of the cyclopentanopolyhydrophenanthrene series, which consists in subjecting, under substantially anhydrous conditions, a secondary alcohol of the cyclopentanopolyhydrophenanthrene series, in which it is theoretically possible to convert at least one hydroxyl group to a keto group, to the action of an excess of a hydrogen acceptor selected from the group consisting of aldehydes and ketones, in the presence of a lithium aluminum organic radical complex, represented by the formula $LiAl(-O-R)_4$, wherein R represents an alkyl radical.

4. A process for the production of polycyclic ketones from polycyclic alcohols which comprises subjecting, under substantially anhydrous conditions, a secondary alcohol of the cyclopentanopolyhydrophenanthrene series, in which it is theoretically possible to convert at least one hydroxyl group to a keto group, to the action of an excess of a hydrogen acceptor selected from the group consisting of aldehydes and ketones, in the presence of a lithium aluminum organic radical complex represented by the formula $LiAl(-O-R)_4$, wherein R represents a hydrocarbon radical, the reaction being conducted at a temperature between about 40 degrees centigrade and about 150 degrees centigrade.

5. The process of claim 4, wherein the lithium aluminum complex is lithium aluminum isopropylate.

6. The process of claim 4, wherein the lithium aluminum complex is lithium aluminum cyclohexylate.

7. The process of claim 4, wherein the lithium aluminum complex is lithium aluminum tertiary-butylate.

8. A process for the production of polycyclic ketones from polycyclic alcohols which comprises subjecting, under substantially anhydrous conditions, a secondary alcohol of the cyclopentanopolyhydrophenanthrene series, in which it is theoretically possible to convert at least one hydroxyl group to a keto group, to the action of an excess of a hydrogen acceptor selected from the group consisting of aldehydes and ketones, in the presence of a lithium aluminum organic radical complex represented by the formula $LiAl(-O-R)_4$, wherein R represents a hydrocarbon radical, the reaction being conducted at a temperature between about 40 degrees centigrade and about 150 degrees centigrade in an organic solvent for the reaction.

9. The process of claim 8, wherein the starting polycyclic alcohol is a cyclopentanopolyhydrophenanthrene hydroxyketone, and the polycyclic ketone produced is a cyclopentanopolyhydrophenanthrene diketone.

10. The process of claim 8, wherein the starting polycyclic alcohol is dehydroepiandrosterone, and the polycyclic ketone produced is 4-androstene-3,17-dione.

11. The process of claim 8, wherein the starting polycyclic alcohol is 5-pregnene-3-ol-20-one, and the polycyclic ketone produced is 4-pregnene-3,20-dione (progesterone).

12. The process of claim 8, wherein the starting polycyclic alcohol is testosterone and the polycyclic ketone produced is 4-andostene-3,17-dione.

13. The process of claim 8, wherein the starting polycyclic alcohol is a cyclopentanopolyhydrophenanthrene hydroxy-ester, and the polyhydrophenanthrene keto-ester.

14. The process of claim 8, wherein the starting polycyclic alcohol is a 5-androstene-3,17-diol,17-ester, and the polycyclic ketone produced is a testosterone 17-ester.

15. The process of claim 8, wherein the starting polycyclic alcohol is 5-androstene-3,17-diol,-17-cyclopentylpropionate, and the polycyclic ketone produced is testosterone 17-cyclopentylpropionate.

16. The process of claim 8, wherein the starting polycyclic alcohol is cholesterol, and the polycyclic ketone produced is 4-cholestenone-3.

17. The process of claim 8, wherein the starting polycyclic alcohol is a 3-hydroxybisnor-5-cholenate, and the polycyclic ketone produced is 3-ketobisnor-4-cholenic acid.

18. A process for the production of polycyclic ketones from polycyclic alcohols which comprises subjecting, under substantially anhydrous conditions, a secondary alcohol of the cyclopentanopolyhydrophenanthrene series, in which it is theoretically possible to convert at least one hydroxyl group to a keto group, to the action of an excess of a hydrogen acceptor selected from the group consisting of aldehydes and ketones, in the presence of a lithium aluminum organic radical complex represented by the formula $LiAl(-O-R)_4$, wherein R represents a hydrocarbon radical, the reaction being conducted at a temperature between about 40 degrees centigrade and about 150 degrees centigrade in an organic solvent for the reaction, acidifying the resulting reaction product, and isolating the polycyclic ketone.

19. A process for the production of polycyclic ketones from polycyclic alcohols which comprises subjecting, under substantially anhydrous conditions, an unsaturated secondary alcohol of the cyclopentanopolyhydrophenanthrene series, in which it is theoretically possible to convert at least one hydroxyl group to a keto group, to the action of an excess of a hydrogen acceptor selected from the group consisting of aldehydes and ketones, in the presence of a lithium aluminum organic radical complex represented by the formula LiAl(—O—R)$_4$, wherein R represents an alkyl radical, the reaction being conducted at a temperature between about 40 degrees centigrade and about 150 degrees centigrade in an organic solvent for the reaction, acidifying the resulting reaction product, and isolating the polycyclic ketone.

ARNOLD C. OTT.
MAXTON F. MURRAY.

REFERENCES CITED

The following references are of record in the file of this patent:

UNITED STATES PATENTS

| Number | Name | Date |
|---|---|---|
| 2,229,599 | Oppenauer | Jan. 21, 1941 |
| 2,257,137 | Strassberger | Sept. 30, 1941 |
| 2,384,335 | Oppenauer | Sept. 4, 1945 |

OTHER REFERENCES

Nystrom: Journal Am. Chemical Society 69, 1197–1199 (1947).